(12) United States Patent
Kulkarni et al.

(10) Patent No.: US 7,368,827 B2
(45) Date of Patent: May 6, 2008

(54) ELECTRICAL ASSEMBLY FOR MONITORING CONDITIONS IN A COMBUSTION TURBINE OPERATING ENVIRONMENT

(75) Inventors: Anand A. Kulkarni, Orlando, FL (US); Ramesh Subramanian, Oviedo, FL (US)

(73) Assignee: Siemens Power Generation, Inc., Orlando, FL (US)

(*) Notice: Subject to any disclaimer, the term of this patent is extended or adjusted under 35 U.S.C. 154(b) by 55 days.

(21) Appl. No.: 11/516,338

(22) Filed: Sep. 6, 2006

(65) Prior Publication Data

US 2008/0054645 A1    Mar. 6, 2008

(51) Int. Cl.
| F01D 15/10 | (2006.01) |
| F02C 6/00 | (2006.01) |
| H02K 7/18 | (2006.01) |
| H02P 9/04 | (2006.01) |

(52) U.S. Cl. .................................................... 290/52
(58) Field of Classification Search ................ 290/52
See application file for complete search history.

(56) References Cited

U.S. PATENT DOCUMENTS

| 3,264,482 A | * | 8/1966 | Kenneth et al. ......... 290/38 A |
| 3,859,785 A | * | 1/1975 | Leto et al. .................... 60/802 |
| 3,876,998 A | | 4/1975 | Richter, et al. ........ 340/870.31 |
| 3,890,456 A | | 6/1975 | Dils ........................... 428/216 |
| 4,057,371 A | * | 11/1977 | Pilarczyk .................... 417/409 |
| 4,087,199 A | * | 5/1978 | Hemsworth et al. ..... 415/173.3 |
| 4,405,283 A | * | 9/1983 | Owsianny .................... 415/14 |
| 4,546,652 A | | 10/1985 | Virkar et al. ................. 73/776 |
| 4,578,992 A | | 4/1986 | Galasko et al. ............ 73/146.5 |
| 4,595,298 A | | 6/1986 | Frederick .................... 374/144 |
| 4,812,050 A | | 3/1989 | Epstein et al. ................. 374/1 |
| 4,851,300 A | | 7/1989 | Przybyszewski ............ 428/623 |
| 4,916,715 A | | 4/1990 | Adiutori ...................... 374/29 |
| 4,969,956 A | | 11/1990 | Kreider et al. ............. 136/201 |
| 4,970,670 A | | 11/1990 | Twerdochlib ................ 702/99 |
| 4,983,034 A | | 1/1991 | Spillman, Jr. ................ 356/32 |
| 5,012,420 A | * | 4/1991 | Walker et al. .............. 701/100 |
| 5,144,299 A | | 9/1992 | Smith .................... 340/870.18 |

(Continued)

OTHER PUBLICATIONS

*Advances in Thin Film Sensor Technologies for Engine Applications.* By Jih-Fen Lei et al. NASA Technical Memorandum 107418. Prepared for Turbo Expo Jun. 2-5, 1997, Orlando, Florida.

(Continued)

*Primary Examiner*—Elvin Enad
*Assistant Examiner*—Pedro J. Cuevas

(57) ABSTRACT

An electrical assembly for use in various operating environments such as a casing of a combustion turbine 10 is provided. The assembly may include an electrical energy-harvesting device 51 disposed in a component within the casing of the turbine to convert a form of energy present within the casing to electrical energy. The harvesting device is configured to generate sufficient electrical power for powering one or more electrical devices therein without assistance from an external power source. One example of electrical devices wholly powered by the energy harvesting device may be a sensor 50 connected for sensing a condition of the component within the casing during operation of the combustion turbine. Another example of electrical devices wholly powered by the energy harvesting device may be a transmitter in communication with the sensor for wirelessly transmitting the data signal outside the casing.

19 Claims, 4 Drawing Sheets

U.S. PATENT DOCUMENTS

| | | | | |
|---|---|---|---|---|
| 5,150,568 | A | * | 9/1992 | White .................. 60/797 |
| 5,285,123 | A | * | 2/1994 | Kataoka et al. ............ 310/88 |
| 5,306,368 | A | | 4/1994 | Yamada et al. ............ 156/86 |
| 5,318,725 | A | | 6/1994 | Sandhage ............... 428/701 |
| 5,440,300 | A | | 8/1995 | Spillman, Jr. ......... 340/10.34 |
| 5,445,027 | A | * | 8/1995 | Zorner .................. 73/593 |
| 5,545,007 | A | * | 8/1996 | Martin ............... 415/173.2 |
| 5,578,877 | A | | 11/1996 | Tiemann ................ 310/15 |
| 5,952,836 | A | | 9/1999 | Haake ................. 324/718 |
| 5,969,260 | A | | 10/1999 | Belk et al. ............... 73/773 |
| 5,970,393 | A | | 10/1999 | Khorrami et al. .......... 455/129 |
| 6,000,977 | A | | 12/1999 | Haake ................. 439/887 |
| 6,034,296 | A | | 3/2000 | Elvin et al. ............ 623/16.11 |
| 6,057,628 | A | * | 5/2000 | Viljoen et al. ............ 310/311 |
| 6,072,165 | A | | 6/2000 | Feldman ............... 219/543 |
| 6,109,783 | A | | 8/2000 | Dobler et al. ........... 374/131 |
| 6,127,040 | A | | 10/2000 | Grobbauer et al. ........ 428/432 |
| 6,142,665 | A | | 11/2000 | Haffner et al. ........... 374/144 |
| 6,197,424 | B1 | | 3/2001 | Morrison et al. .......... 428/402 |
| 6,262,550 | B1 | | 7/2001 | Kliman et al. ........... 318/565 |
| 6,273,671 | B1 | * | 8/2001 | Ress, Jr. .................. 415/1 |
| 6,280,083 | B2 | | 8/2001 | Kita et al. ............... 374/140 |
| 6,331,823 | B1 | | 12/2001 | El-Ibiary ............ 340/870.16 |
| 6,343,251 | B1 | | 1/2002 | Herron et al. ............ 701/100 |
| 6,398,503 | B1 | | 6/2002 | Takahashi et al. | |
| 6,437,681 | B1 | | 8/2002 | Wang et al. ............... 338/25 |
| 6,487,491 | B1 | * | 11/2002 | Karpman et al. .......... 701/100 |
| 6,512,379 | B2 | | 1/2003 | Harrold et al. ........... 324/632 |
| 6,523,383 | B2 | | 2/2003 | Joki et al. ............... 72/13.4 |
| 6,532,412 | B2 | | 3/2003 | Adibhatla et al. ......... 701/100 |
| 6,556,956 | B1 | | 4/2003 | Hunt .................. 702/188 |
| 6,576,861 | B2 | | 6/2003 | Sampath et al. ....... 219/121.48 |
| 6,591,182 | B1 | | 7/2003 | Cece et al. ............. 701/100 |
| 6,667,725 | B1 | | 12/2003 | Simons et al. ........... 343/895 |
| 6,677,683 | B2 | | 1/2004 | Klausing et al. .......... 290/1 R |
| 6,679,433 | B2 | * | 1/2004 | Gordon et al. ........... 237/12.1 |
| 6,692,222 | B2 | * | 2/2004 | Prinz et al. ............... 415/14 |
| 6,735,549 | B2 | | 5/2004 | Ridolfo ................ 702/181 |
| 6,756,131 | B2 | | 6/2004 | Oguma et al. ............ 428/632 |
| 6,756,908 | B2 | | 6/2004 | Gass et al. ............. 340/679 |
| 6,760,689 | B2 | | 7/2004 | Follin et al. ............. 702/188 |
| 6,792,187 | B2 | | 9/2004 | Andrus et al. ............ 385/123 |
| 6,796,187 | B2 | | 9/2004 | Srinivasan et al. ........... 73/784 |
| 6,808,813 | B2 | | 10/2004 | Kimura et al. ............ 428/447 |
| 6,816,817 | B1 | | 11/2004 | Retlich et al. ............ 702/188 |
| 6,831,555 | B1 | | 12/2004 | Miller et al. ............. 340/506 |
| 6,838,157 | B2 | | 1/2005 | Subramanian ............. 428/173 |
| 6,907,727 | B2 | * | 6/2005 | Turchetta ................ 60/409 |
| 6,979,498 | B2 | | 12/2005 | Darolia et al. ........... 428/633 |
| 6,979,991 | B2 | | 12/2005 | Burns et al. ............. 324/71.1 |
| 7,004,622 | B2 | | 2/2006 | Hardwicke et al. ........ 374/141 |
| 7,009,310 | B2 | | 3/2006 | Cheung et al. ........... 290/1 R |
| 7,079,957 | B2 | * | 7/2006 | Finnigan et al. ........... 702/33 |
| 7,125,223 | B2 | * | 10/2006 | Turnquist et al. ........ 415/173.2 |
| 2004/0114666 | A1 | | 6/2004 | Hardwicke et al. ........ 379/179 |
| 2005/0198967 | A1 | * | 9/2005 | Subramanian ............. 60/803 |
| 2006/0000283 | A1 | * | 1/2006 | Twerdochlib .............. 73/593 |
| 2006/0018361 | A1 | | 1/2006 | Hardwicke et al. ........ 374/141 |
| 2006/0020415 | A1 | | 1/2006 | Hardwicke et al. ........ 702/133 |
| 2006/0056959 | A1 | * | 3/2006 | Sabol et al. ............. 415/118 |
| 2006/0056960 | A1 | * | 3/2006 | Sabol et al. ............. 415/118 |
| 2006/0171806 | A1 | * | 8/2006 | Twerdochlib .............. 416/61 |
| 2007/0126292 | A1 | * | 6/2007 | Lugg ................... 310/11 |

OTHER PUBLICATIONS

*Wireless Telemetry for Gas-Turbine Applications.* By Russel G. DeAnna. NASA Technical Memorandum 2000-209815, Mar. 2000.

*Thermophotovoltaic furnace-generator for the home using low bandgap GaSb cells.* By L.M. Fraas et al. Semiconductor Science and Technology, vol. 18, 2003, pp. S247-S253.

*Metallic thin-film thermocouple for thermoelectric microgenerators.* By E Casaano et al. Sensors and Actuators A 60, 1997, pp. 65-67.

*A novel thick-film piezoelectric micro-generator.* By N.M. White et al. Smart Materials and Structures, vol. 10, 2001, pp. 850-852.

* cited by examiner

ELECTRICAL ASSEMBLY FOR MONITORING CONDITIONS IN A COMBUSTION TURBINE OPERATING ENVIRONMENT

FIELD OF THE INVENTION

The present invention relates generally to a system for wirelessly monitoring conditions in a hot temperature operating environment such as a combustion turbine, and in particular to direct conversion energy-harvesting devices for electrically powering one or more monitoring sensors and associated electronic devices within such an operating environment.

BACKGROUND OF THE INVENTION

Combustion turbines are used for a variety of applications such as driving an electric generator in a power generating plant or propelling a ship or an aircraft. Firing temperatures in modern gas turbine engines continue to increase in response to the demand for higher efficiency engines. Superalloy materials have been developed to withstand the corrosive high temperature environment that exists within a gas turbine engine. However, even superalloy materials are not able to withstand extended exposure to the hot combustion gas of a present generation gas turbine engine without some form of cooling and/or thermal insulation.

Thermal barrier coatings are widely used for protecting various hot gas path components of a gas turbine engine. The reliability of such coatings is critical to the overall reliability of the machine. The design limits of such coatings are primarily determined by laboratory data. However, validation of thermal barrier coating behavior when subjected to the stresses and temperatures of the actual gas turbine environment is essential for a better understanding of the coating limitations. Such real world operating environment data is very difficult to obtain, particularly for components that move during the operation of the engine, such as the rotating blades of the turbine.

Despite the substantial sophistication of modern turbine engines, such as gas turbines for generating electrical power or aircraft engines for commercial and military use, designers and operators have had relatively limited information regarding the internal status of the turbine engine components during operation. This is due to the harsh operating conditions, which have prevented the use of traditional sensors for collecting reliable information of critical engine components.

Many present turbines are equipped with sensors capable of somewhat limited functions such as exhaust gas-path temperature measurements, flame detection and basic turbine operating conditions. Based on this information, turbine operators such as utility companies operate engines in a passive mode, in which maintenance is scheduled based on prior histories of similar engines. Engine rebuilds and routine maintenance are performed in the absence of a prior knowledge of the remaining or already utilized life of individual components. The lack of specific component information makes early failure detection very difficult, often with the consequence of catastrophic engine failure due to abrupt part failure. This results in inefficient utilization, unnecessary downtime and an enormous increase in operating cost.

Presently, the gas turbine industry approach is to depend on the measurement of gas path temperature, which is related back to specific component problems based on experience and history regarding a class of engines. This approach is highly subjective and only allows for determining already severe situations with an engine. It does not provide indications of impending damage or insight into the progression of events leading up to and causing engine damage due to component degradation or failure.

The instrumentation of a component such as a blade or vane within a steam turbine typically includes placing wire leads on the balance wheel, which continue on to the blade airfoil. The wire leads are typically held together by an epoxy. These wires are routed from within the component to the turbine casing. The pressure boundary of a component may be breached to introduce a sensor such as a thermocouple and a braze is back filled to hold the thermocouple in place. Each thermocouple sensor has wire leads coming out of the component that are connected back to a diagnostic unit. Instrumenting a plurality of components of a turbine in this manner results in an extensive network of wires just for monitoring the single operating condition of temperature. Instrumenting components using this technique is expensive, which is a barrier to instrumenting a large number of components within a single turbine. Further, the wire leads and data transfer is frequently poor, which can result in costly repairs and flawed data analysis.

Embedded and/or surface-mounted sensor technology together with wireless telemetry are increasingly being used for real-time structural health monitoring and prognostics of critical components in present turbine engines to meet the demanding requirements of the future. However, these wireless sensors and their associated electronics (e.g., transmitters, receivers, transceivers, etc.,) need electric power sources that last as long as the sensing application itself. Since the operating environments and physical constraints in a gas turbine render it difficult for conventional powering approaches to be fully effective, e.g., battery-powered approach and galvanic power coupling, it is desirable to provide active power generation modalities for powering these wireless sensors/telemetry systems through scavenging or harvesting electrical power from one or more forms of energy available in the operating environment of the combustion turbine.

DETAILED DESCRIPTION OF THE INVENTION

Figure 1:
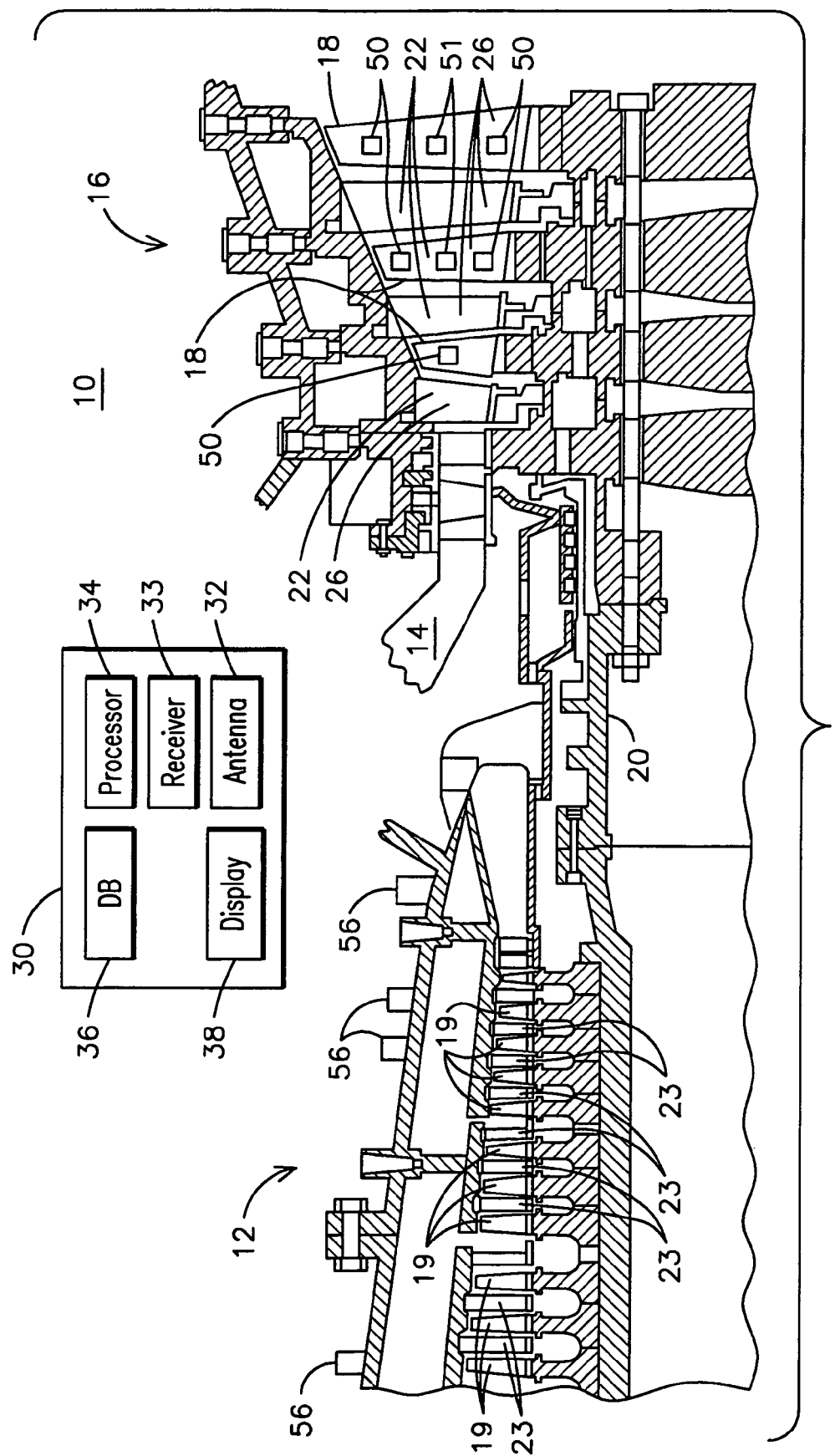
FIG. 1 is a cross sectional view of an exemplary combustion turbine with which embodiments of the invention may be used and an exemplary monitoring and control system for collecting and analyzing component data from the combustion.

FIG. 1 illustrates an exemplary combustion turbine 10 such as a gas turbine used for generating electricity as will be recognized by those skilled in the art. Embodiments of the invention may be used with combustion turbine 10 or in numerous other operating environments and for various purposes as will be recognized by those skilled in the art. For example, embodiments may be used in aircraft engines, monitoring temperature and heat flux in boilers, heat exchangers and exhaust stacks; determining insulation performance and degradation; determining pipe fouling; and evaluating vibrating component health. Embodiments may be used in the automotive industry for monitoring combustion chamber conditions, rotating components such as crankshaft, cams, transmissions and differentials, and determining suspension and frame integrity for heavy-duty vehicles. Embodiments may also be used in measuring strain and heat flux in tanks, portable and other equipment operating in dessert, wet, and/or high temperature configurations.

Returning to FIG. 1, combustion turbine 10 includes a compressor 12, at least one combustor 14 (broken away) and a turbine 16. Compressor 12, combustor 14 and turbine 16 are sometimes referred to collectively as a gas turbine engine. Turbine 16 includes a plurality of rotating blades 18, secured to a rotatable central shaft 20. A plurality of stationary vanes 22 are positioned between blades 18, with vanes 22 being dimensioned and configured to guide air over blades 18. Blades 18 and vanes 22 will typically be made from nickel or cobalt alloys, and may be coated with a thermal barrier coating 26, such as yttria-stabilized zirconia. Similarly, compressor 12 includes a plurality of rotating blades 19 positioned between respective vanes 23.

In operation, air is drawn in through compressor 12, where it is compressed and driven towards combustor 14. Combustor 14 mixes the air with fuel and ignites it thereby forming a working gas. This working gas will typically be above 1300° C. This gas expands through turbine 16, being guided across blades 18 by vanes 22. As the gas passes through turbine 16, it rotates blades 18 and shaft 20, thereby transmitting usable mechanical work through shaft 20. Combustion turbine 10 may also include a cooling system (not shown), dimensioned and configured to supply a coolant, for example steam or compressed air, to blades 18 and vanes 22.

The environment wherein blades 18 and vanes 22 operate is subject to high operating temperatures and is particularly harsh, which may result in serious deterioration of blades 18 and vanes 22. This is especially likely if the thermal barrier coating 26 should spall or otherwise deteriorate. Embodiments of the invention are advantageous because they allow components to be configured for transmitting data indicative of a component's condition during operation of combustion turbine 10. Blades 18, 19, vanes 22, 23, and coatings 26, for example, may be configured for transmitting component specific data that may be directly monitored to determine the respective condition of each component during operation and to develop predictive maintenance schedules.

FIG. 1 also illustrates a schematic of an exemplary monitoring and control system 30 that may be used in accordance with various aspects of the present invention. System 30 may include an antenna 32, a receiver 33, a processor or central processing unit (CPU) 34, a database 36 and a display 38. Processor 34, database 36 and display 38 may comprise appropriately configured conventional components and antenna 32 and receiver 33 may have performance specifications that may be tailored as a function of various embodiments of the invention. For example, antenna 32 and receiver 33 may be selected for receiving wireless telemetry data transmitted from a plurality of transmitters deployed in various locations throughout combustion turbine 10 as more fully described below.

Embodiments of the present invention allow for a plurality of sensors to be embedded within the respective coatings of a plurality of components within combustion turbine 10. Alternate embodiments allow for the sensors to be surface mounted or deposited to components, especially those contained in areas where components do not require a barrier coating such as the compressor. Exemplary embodiments of sensors may be used to provide data to system 30 with respect to physical characteristics of a component and/or properties of a component's coating as well as other component or coating specific information. The foregoing may also apply to the power sources for the sensors. Accordingly, unless the context indicates otherwise, descriptive aspects in connection with an electrical assembly that includes a "sensor" or "sensors" may also include their power sources, (e.g., one or more energy-harvesting devices).

Exemplary sensors may be used to detect wear between two components, measure heat flux across a component's coating, detect spalling of a coating, measure strain across an area of a component or determine crack formation within a component or coating. Those skilled in the art will recognize other properties and/or characteristics of a component or component coating that may be measured and/or detected in accordance with aspects of the invention.

It will be appreciated that aspects of the invention allow for various sensor configurations to be embedded within a barrier coating such as a barrier coating 26 of blades 18 or vanes 22 of turbine 16. U.S. Pat. No. 6,838,157, which is specifically incorporated herein by reference, describes various embodiments of methods for instrumenting gas turbine components, such as blades 18 and vanes 22 that may be utilized for depositing sensors in accordance with aspects of the present invention. This patent discloses various methods of forming trenches in a barrier coating, forming a sensor in the coating and depositing a backfill material in the trench over the coating. Embodiments of those methods and components may be used to form smart components as disclosed herein.

U.S. Pat. No. 6,576,861, which is specifically incorporated herein by reference, discloses a method and apparatus that may be used to deposit embodiments of sensors and sensor connectors with transmitters and power sources in accordance with aspects of the present invention. In this respect, methods and apparatus disclosed therein may be used for the patterning of fine sensor and/or connector features of between about 100 microns and 500 microns without the need of using masks. Multilayer electrical circuits and sensors may be formed by depositing features using conductive materials, resistive materials, dielectric materials, insulative materials and other application specific materials. It will be appreciated that other methods may be used to deposit multilayer electrical circuits and sensors in accordance with aspects of the invention. For example, thermal spraying, vapor deposition, laser sintering and curing deposits of material sprayed at lower temperatures may be used as well as other suitable techniques recognized by those skilled in the art.

Embodiments of the invention allow for a plurality of sensors 50 and power sources (e.g., one or more energy-harvesting devices) 51 to be deployed in numerous places within combustion turbine 10 for monitoring component-specific or coating-specific conditions as well as collecting other data with respect to the operation or performance of combustion turbine 10. For example, FIG. 1 illustrates that one or more sensors 50 may be embedded within respective barrier coatings 26 of one or more blades 18 of turbine 16. It will be appreciated that sensors 50 may be embedded within barrier coatings of other components with turbine 16 for which component-specific and/or coating-specific data is to be acquired.

Figure 2:
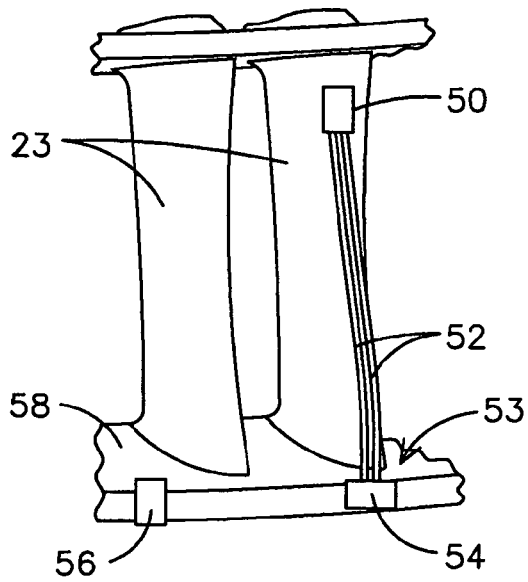
FIG. 2 a perspective view of an exemplary combustion turbine vane equipped with one exemplary embodiment of the present invention.

FIG. 2 illustrates a pair of vanes 23 removed from compressor 12 with one vane having a sensor 50 mounted or connected with vane 23 for detecting a condition of vane 23. A connector 52 may be provided as a means for routing a data signal from sensor 50 to a transmitter 54 configured for wirelessly transmitting the data signal to a transceiver 56. Connector 52 may be one or a plurality of electrical leads for conducting a signal from sensor 50 to a surface mounted transmitter 54. Alternate embodiments allow for various types of connectors 52 to be used as a means for routing a data signal from sensor 50 to transmitter 54, depending on the specific application. For example, one or a plurality of fiber optic connectors may be used for routing a signal using single or varying wavelengths of light.

Embodiments allow for transmitters 54 to be multi-channel and have various specifications depending on their location within a casing of combustion turbine 10. Transmitters 54 may be configured to function within the compressor 12 casing subject to operating temperatures of between about 80° C. to 120° C. They may also be configured to function within the turbine 12 casing subject to operating temperatures of between about 300° C. to 350° C. of higher, and be resistant to oxidative exposure.

Figure 3:
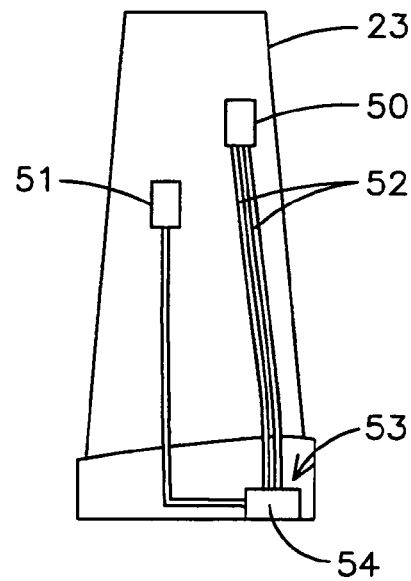
FIG. 3 is a schematic view of a vane of FIG. 2.

FIG. 3 illustrates a schematic plan view of compressor vane 23 having sensor 50 connected therewith and connector 52 connecting sensor 50 with transmitter 54. An energy-harvesting device 51 embodying aspects of the present invention may be provided for powering transmitter 54.

Figure 4:
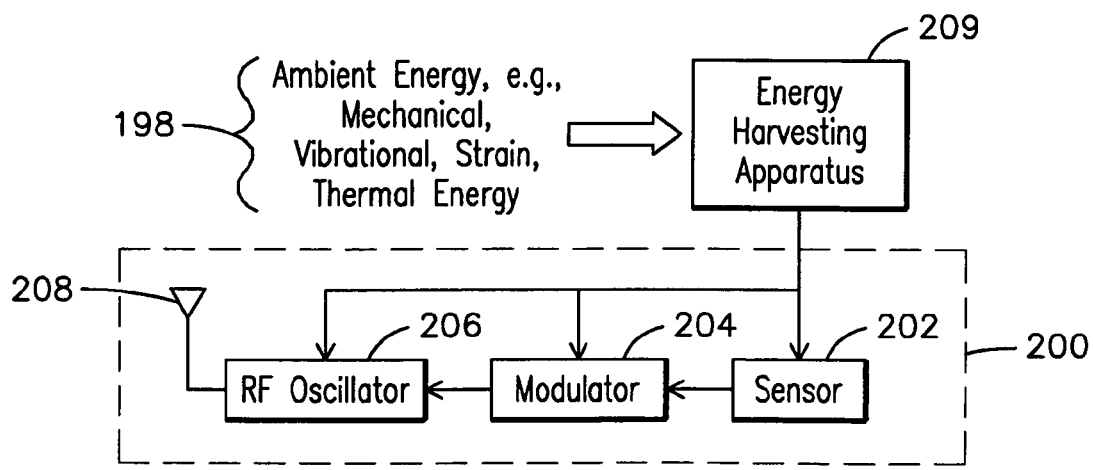
FIG. 4 is block diagram of an example embodiment of an energy harvesting apparatus, such as may be used for powering a wireless telemetry system.

The inventors of the present invention have innovatively recognized that energy harvesting may be an attractive solution to wholly meeting the monitoring power needs in a challenging operational environment where electrical power may be harvested from one or more forms of energy 198 (FIG. 4) present in this operational environment, such as thermal, mechanical, (e.g., strain, vibrational, acoustic, etc.) and radiative energy. It is contemplated that this approach could provide nearly unlimited, environmentally clean, electric power for a relatively low-power wireless telemetry system 200, such as may include an electrical assembly comprising a sensor 202 connected to supply a sensor signal output to a modulator 204 connected to supply a demodulated signal to an oscillator 206 for wireless transmission via an antenna 208. An energy harvesting apparatus 209, such as may be made up of one or more direct conversion devices (e.g., energy harvesting devices that directly convert a form of energy into electricity), may be used for wholly powering the wireless telemetry system 200, such as without assistance from an external power source. In one example embodiment, such devices may use materials with thermoelectric, thermo-photovoltaic and piezoelectric characteristics configured to implement this energy harvesting.

The following section outlines examples of possible techniques of power generation that may be implemented.

Figure 5:
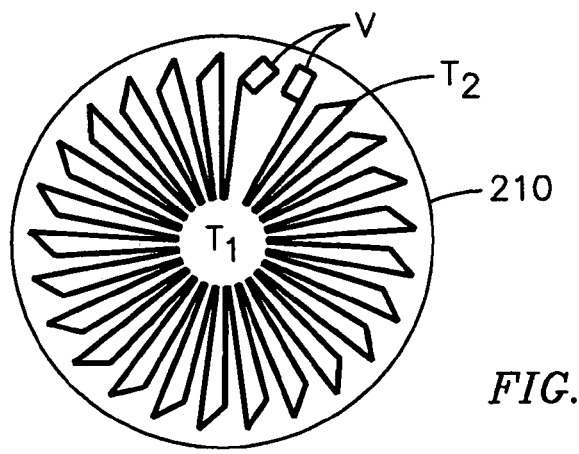
FIG. 5 is a schematic representation of an example embodiment of a thermoelectric harvesting device for directly converting heat energy to electricity using a thermopile arrangement.

Thermoelectric power generation: This example technique presents an efficient and environmentally clean means of directly converting heat energy to electricity. In one example embodiment seen in FIG. 5, this may involve utilization of a thermopile 210 (e.g., a series circuit of thermocouple lines) connected to generate electric power based on the Seebeck effect. The thermopile could be made up of ceramic or metallic thermocouples, which can be deposited by any of various manufacturing techniques, such as plasma spraying, electron beam (EB) deposition, physical vapor deposition (PVD) chemical vapor deposition (CVD), pulsed laser deposition, mini-plasma, direct-write, mini-high velocity oxyfuel (hvof) or solution plasma spraying. This technique takes advantage of the relatively large thermal gradient that occurs in thermal barrier coatings (TBC), from the surface to the coating, (e.g., between a first region with temperature $T_1$ and a second region with a temperature $T_2$). For example, this thermal gradient allows generating a voltage V across the output terminals of the thermopile.

Figure 6:
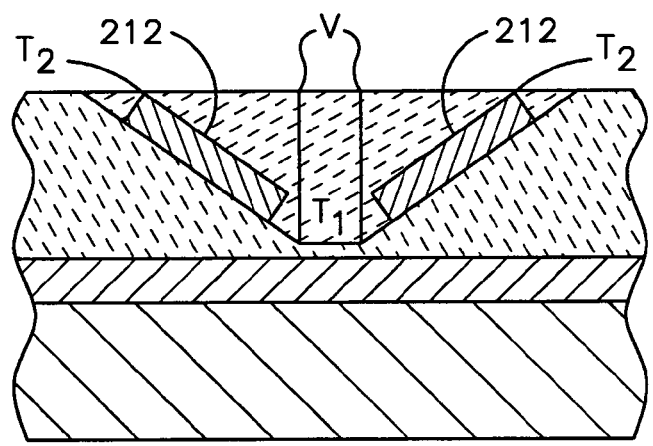
FIG. 6 is a cross-sectional view illustrating one example embodiment of a thermoelectric harvesting device, wherein a thermopile may be deposited on a thermal barrier coating.

In one example embodiment, the thermopile may be deposited on the TBC, as shown in the cross-sectional view in FIG. 6 where two thermocouple lines 212 may be seen. Generally, since the two junctions experience different temperatures, a Seebeck voltage is generated. This voltage (V) can be approximated as $V=\alpha_{AB}(T_{hot}-T_{cold})$, where $\alpha_{AB}$ denotes the relative Seebeck coefficient of materials A and B, which compose the thermocouple. Examples of materials suitable for thermoelectric power generation (in addition to conventional metallic materials (e.g., type K, N, etc.)) may include quasicrystal based materials, such as aluminum based quasicrystal alloys, e.g., Al—Cu—Fe, Al—Pd—Mn, Al—Pd—Re etc, and various semiconductor materials, such as Silicon-Germanium alloys and $FeSi_2$, which are believed to have potential as thermoelectric materials due to their unique thermal and electronic properties and high temperature stability.

Figure 7:
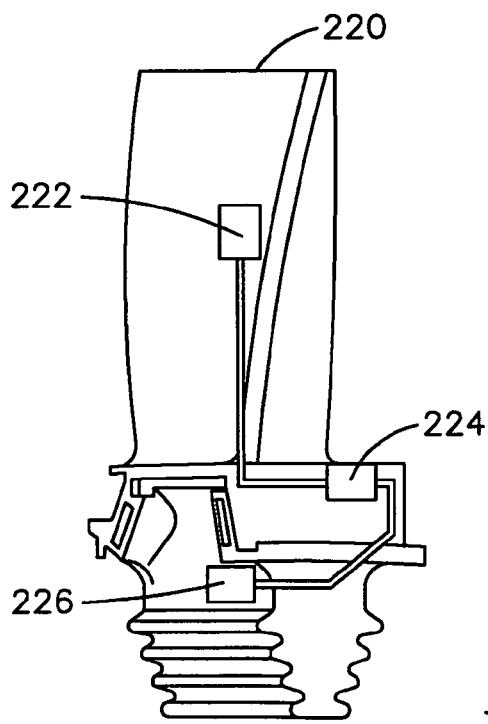
FIG. 7 is a schematic representation of an example embodiment of a thermoelectric harvesting device wherein a plurality of thermocouples may be connected to operate in a differential mode to enhance the effects of thermal gradients that may develop at different locations of a given turbine component.

As illustrated in FIG. 7, a plurality of thermocouples may be connected to operate in a differential mode to enhance the effects of thermal gradients that may develop at different locations of a given turbine component, such as an air foil 220. For example, a first thermocouple 222 may be disposed at the airfoil which operates at a first temperature, a second thermocouple 224 may be disposed at a platform for the airfoil which operates at a second temperature different (e.g., lower) than the first temperature, and a third thermocouple 226 may be disposed at the root of the airfoil, which operates at a third temperature different than the first and second temperatures. In a differential mode of operation, in lieu of just obtaining the separate effects of the thermal gradients, one would obtain a larger a Seebeck voltage by combining the effects of such thermal gradients.

Figure 8:
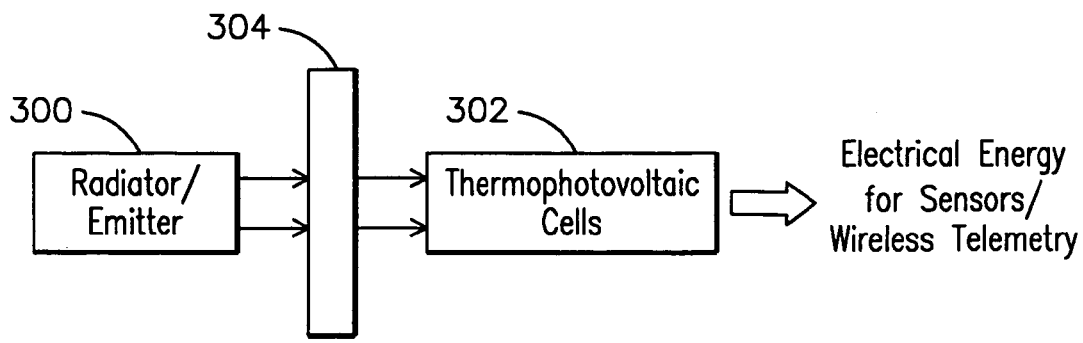
FIG. 8 is a block diagram representation of an example embodiment of a thermophovoltaic harvesting device for directly converting heat energy to electricity.

Thermo-photovoltaic generation: In this other example of electric power generation through direct conversion, one or more thermophotovoltaic (TPV) devices may be provided to convert heat into electricity, where semiconductors are "tuned" to the longer-wavelength, invisible infrared radiation emitted by warm objects. This technique may involve a suitable emitter 300, e.g., a ceramic radiant emitter, heated by an energy source, which is thermally coupled to the TPV generator by outwardly radiating the heat where it can be absorbed by one or more thermo-photovoltaic cells 302 and converted directly into electricity, as shown in FIG. 8. Relatively thin film cells could be made of silicon or advanced low bandgap doped antimonides (GaSb, GaInSb, GaInAsSb etc.) Typically, low-bandgap diodes improve power density and spectral control at lower radiator temperatures. These films can be deposited by plasma spraying, EB PVD, CVD, pulsed laser deposition, mini-plasma, direct-write, mini-hvof or solution plasma spraying.

In one example embodiment, it is contemplated that the combustion gases may be used to heat a static surface which will act as a radiator (may be made of an oxide [e.g., Erbia, Magnesia, etc.] or SiC) to generate a thermal radiation spectrum. Thermal radiation is transmitted to the TPV cells that absorb the radiation and convert a fraction of the absorbed radiation (e.g., radiation with energy levels above those in the semiconductor band gap) into useful electric power. Between the emitter and the photovoltaic cells one may dispose a filter 304 (e.g., a spectral control device), as may be configured to transmit above band gap energy to the TPV cell and to reflect below band gap energy back to the radiator for recuperation and increased system efficiency.

Figure 9:
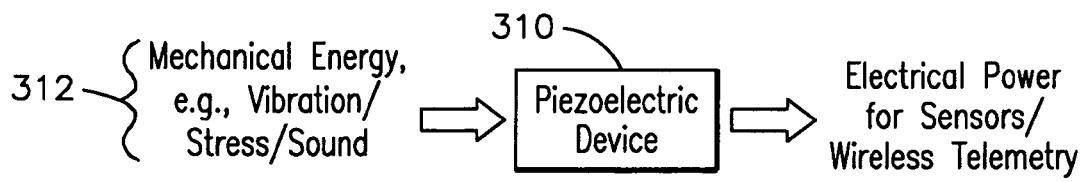
FIG. 9 is a block diagram representation of an example embodiment of a piezoelectric harvesting device for directly converting one or more modalities of mechanical energy to electricity.

Piezoelectric power generation: This example technique involves piezoelectric devices 310 that develop an electric charge when mechanically loaded. Thus, this approach would take advantage of various forms of mechanical energy 312 (e.g., vibrational, stress, sound, etc.,) that are present in the turbine environment to generate electricity, as shown in FIG. 9. Due to the harsh high temperature environment, it is contemplated that thin films of piezoelectric materials with relatively high curie temperatures would be employed (e.g., modified lithium niobates, or bismuth titanates).

In a turbine environment, when a stress is applied to the piezoelectric film, the piezoelectric effect causes the generation of an electrical charge between the two faces of the material when it is mechanically stressed. If the electrodes are not short-circuited, a voltage associated with the charge appears. This charge is proportional to the vibration/stress intensity, and thus can be used as a measure for the pressure. The piezoelectric element stores the energy in two forms, as an electric field (electrical energy) and as a strain (mechanical energy). Therefore, piezoelectrics are materials that allow conversion between electrical and mechanical energy and vice versa. Thus, this property may be used for harvesting energy from the environment.

In alternate embodiments transmitter 54 may be located remotely from vane 23 and may receive signals from sensor 50 via connector 52 that are subsequently wirelessly transmitted to transceiver 56. Transceiver 56 may be mounted on hub 58 or on a surface external to compressor 12 such as the exemplary locations shown in FIG. 1. Transceiver 56 may be mounted in various locations provided it is within sufficient proximity to transmitter 54 to receive a wireless data transmission, such as an RF signal from transmitter 54. Transceiver 56 may transmit the RF signal to antenna 32 of system 30 where the signal may be processed for monitoring the condition of compressor vane 23.

With respect to FIGS. 2 and 3, one or more sensors 50 may be connected with one or more compressor vanes 23 by fabricating sensor 50 directly onto a surface of vane 23. Connector 52 may be deposited directly onto a surface of vane 23. In alternate embodiments a trench or recess may be formed within a surface of vane 23 that is sized for receiving a deposited sensor 50 and connector 52. Sensor 50 and connector 52 may be deposited within the recess and protected by depositing a coating of suitable material onto a surface of vane 23 over sensor 50 and connector 52. In other alternate embodiments a coating may be deposited onto a surface of vane 23, a trench may be formed within the coating and sensor 50 and connector 52 may be deposited within the trench. A protective coating may be deposited over sensor 50 and/or connector 52.

Connector 52 may extend from sensor 50 to a termination location, such as the peripheral edge of vane 23 so that a distal end 53 of connector 52 is exposed for connection to transmitter 54. Sensor 50 and connector 52 may be positioned on vane 23 to minimize any adverse affect on the aerodynamics of vane 23.

In an embodiment, one or more sensors 50, such as strain gauges or thermocouples, for example, may be deposited on one or more turbine or compressor blades 18,19.

Figure 10:
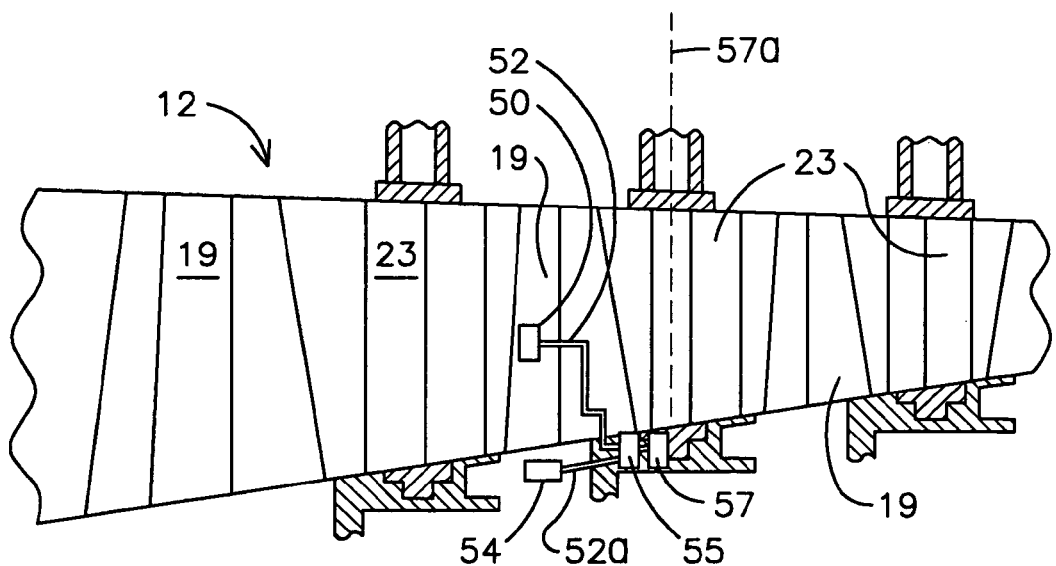
FIG. 10 is a schematic cross section of the compressor of FIG. 1.

FIG. 10 illustrates an embodiment with respect to compressor 12. A connector 52 may be deposited to connect each sensor 50 to one or more transmitters 54 connected with blade 18,19. It will be appreciated that exemplary embodiments allow for a plurality of sensors 50 to be connected with a single transmitter 54 via respective connectors 52. For example, a sensor 50 may be deposited on each of a plurality of blades 18,19. A connector 52 may be deposited to route a signal from each sensor 50 to a single transmitter 54.

Transmitter 54 and a rotating antenna 55 may be mounted proximate the root of blade 18, 19. Connector 52 may be routed from sensor 50 aft to the root of blade 18, 19 to connect sensor 50 with rotating antenna 55, which may in turn be connected with transmitter 54 via a connector 52*a*. A stationary antenna 57 may be installed on a turbine or compressor vane 22, 23 aft of the root of respective blade 18,19. A lead wire 57*a* may be routed from stationary antenna 57 out of compressor 12 or turbine 16 to broadcast a signal to system 30.

It will be appreciated by those skilled in the art that one or more sensors 50 may be mounted to, such as by a spray deposition, each compressor blade 19 within a row of blades 19 mounted on a disk within compressor 12. A respective connector 52 may connect each sensor 50 to a respective transmitter 54 mounted proximate the root of each blade 19 within the row. Rotating antenna 55 may encircle the disk proximate the root of each blade 19 and be connected with each transmitter 54 via a respective connector 52*a*. One or more stationary antennas 57 may be installed on a compressor vane 23 aft of the row of compressor blades 19, or in another location, such as a compressor hub sufficiently proximate to rotating antenna 55 for signal broadcasting and receiving. Stationary antenna 57 may also encircle the row of blades 19. Rows of blades 18 in turbine 16 may be similarly configured.

In one example embodiment, a non-rotating component, such as a vane in turbine 16, may have a barrier coating deposited thereon. Sensor 50 and/or energy harvesting device 51 may be embedded beneath an upper surface of the barrier coating. In one embodiment, a transmitter may be surface mounted on the vane or embedded within the coating. Alternate embodiments allow for the transmitter to be located elsewhere such as on a platform to which the vane is connected or in a cooling flow channel, for example, as will be recognized by those skilled in the art.

Embodiments of the present invention allow for deploying a plurality of sensors 50 throughout combustion turbine 10 by either surface mounting them to components or embedding them within respective component barrier coatings to collect specific component condition data and transmit that data using wireless telemetry to monitoring and control system 30. This approach is advantageous in that it allows for the replacement, repair and maintenance decision-making processes to be based on the condition of specific components during operation of combustion turbine 10.

In this respect, specific component condition data may be received by antenna 32 and receiver 33 then stored in database 36 by CPU 34. Embodiments allow for specific component condition data to be collected and presented to an operator in real time via display 38. This allows for an operator to make instantaneous decisions regarding the operation of combustion turbine 10 in response to the condition of a specific component or components.

Historical data may be compiled and analyzed with respect to each component for making repair, replacement or maintenance decisions with respect to that component. Operating conditions and specific components of combustion turbine 12 may be monitored sets of conditions may be isolated that are indicative of a component or components needing to be repaired or replaced, or of corrective action to be taken with respect to operation of the gas turbine. These aspects allow for significant improvement in predictive maintenance schedules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. An electrical assembly for use during operation of a combustion turbine, the electrical assembly comprising:
at least one energy-harvesting device disposed in a component within a casing of the combustion turbine, the at least one energy-harvesting device configured to harvest a form of energy contained within the casing of the turbine to generate sufficient electrical power for wholly powering one or more electrical devices therein; and
at least one sensor coupled to receive electrical power generated by the at least one energy-harvesting device, said sensor configured to sense a condition of the component within the casing during operation of the combustion turbine, the at least one sensor constituting one of the electrical devices therein.

2. The electrical assembly of claim 1 wherein the energy-harvesting device comprises a thin film coating disposed on a surface of the component.

3. The electrical assembly of claim 1 wherein the energy-harvesting device comprises a thin film coating disposed on a substrate of the component.

4. The electrical assembly of claim 1 wherein the energy-harvesting device comprises a semiconductor device.

5. The electrical assembly of claim 1 wherein the energy-harvesting device is selected from the group consisting of a thermoelectric harvesting device, a thermophotovoltaic harvesting device, a piezoelectric harvesting device, and a combination of the foregoing harvesting devices.

6. The electrical assembly of claim 1 wherein the energy-harvesting device is a thermoelectric harvesting device comprising at least one thermopile disposed on a barrier coating deposited on a substrate of the component to be responsive to a thermal gradient that develops along a thickness of the coating.

7. The electrical assembly of claim 1 wherein the electrical energy-harvesting device is a thermoelectric harvesting device comprising two or more thermocouple lines disposed on respective regions of the component exposed to different thermal loads, the two or more thermocouple lines connected to one another to operate in a differential mode to combine an effect of two or more thermal transients that result from the different thermal loads and thereby increase a voltage level of the harvested electrical power.

8. The electrical assembly of claim 1 further comprising a transmitter coupled to receive electrical power from the harvesting device, the transmitter constituting another of the electrical devices therein.

9. The electrical assembly of claim 8 wherein the transmitter is configured to be in communication with the sensor for receiving a data signal supplied by the sensor and wirelessly transmitting the data signal outside the casing.

10. The electrical assembly of claim 9 further comprising a transceiver located outside the casing for receiving the transmitted data signal.

11. The electrical assembly of claim 10 further comprising a processor in communication with the transceiver for processing the data signal to develop information regarding a condition of the component during operation of the gas turbine.

12. A method for monitoring conditions during operation of a combustion turbine, the method comprising:
harvesting a form of energy contained within a casing of the turbine to generate sufficient electrical power for powering one or more electrical devices therein without assistance from an external power source;
coupling at least one sensor to receive harvested electrical power, the at least one sensor constituting one of the electrical devices therein;
sensing with the at least one sensor a condition of a component within the casing during operation of the combustion turbine;
coupling a transmitter to receive harvested electrical power, the transmitter constituting another of the electrical devices therein; and
coupling the transmitter to receive a data signal supplied by the sensor and wirelessly transmitting the data signal outside the casing.

13. The method of claim 12 further comprising performing the harvesting with at least one energy-harvesting device disposed in the component within the casing of the combustion turbine.

14. The method of claim 12 wherein the harvesting comprises at least one of the following: harvesting thermal energy, harvesting mechanical energy, and a combination of the foregoing.

15. A combustion turbine comprising:
a casing;
at least one electrical energy-harvesting device disposed in a component within the casing of the turbine to convert a form of energy present within the casing to electrical energy, wherein the form of energy comprises at least one of the following forms of energy: thermal energy, mechanical energy, and a combination of the foregoing, the at least one electrical energy-harvesting device configured to generate sufficient electrical power for powering one or more electrical devices therein without assistance from an external power source;
at least one sensor coupled to sense a condition of the component within the casing during operation of the combustion turbine disposed, the at least one sensor constituting one of the electrical devices therein; and a transmitter coupled to the sensor for receiving and wirelessly transmitting a data signal supplied by the sensor, the transmitter constituting another of the electrical devices therein.

16. The combustion turbine of claim 15 further comprising at least one turbine blade assembly comprising a hub and a plurality of turbine blades radially extending from the hub, wherein at least one of the following is disposed on at least one of the turbine blades: 1) the at least one harvesting device, 2) the at least one sensor, and 3) the transmitter.

17. The combustion turbine of claim 15 further comprising at least one compressor blade assembly comprising a hub and a plurality of compressor blades radially extending from the hub, wherein at least one of the following is disposed on at least one of the compressor blades: 1) the at least one harvesting device, 2) the at least one sensor, and 3) the transmitter.

18. The combustion turbine of claim 15 further comprising at least one combustor, wherein at least one of the following is disposed on a surface of the at least one combustor: 1) the at least one harvesting device, 2) the at least one sensor, and 3) the transmitter.

19. The combustion turbine of claim 15 further comprising at least one stationary assembly within the casing of the turbine, wherein at least one of the following is disposed on the at least one stationary assembly: 1) the at least one harvesting device, 2) the at least one sensor, and 3) the transmitter.

* * * * *